US006396719B2

(12) United States Patent
Morita et al.

(10) Patent No.: US 6,396,719 B2
(45) Date of Patent: May 28, 2002

(54) DC-TO-DC CONVERTER

(75) Inventors: Koichi Morita, Fujimi; Toshiyuki Yamagishi, Kounosu, both of (JP)

(73) Assignee: Sanken Electric Co., Ltd., Saitama-Ken (JP)

( * ) Notice: Subject to any disclaimer, the term of this patent is extended or adjusted under 35 U.S.C. 154(b) by 0 days.

(21) Appl. No.: 09/859,935

(22) Filed: May 17, 2001

(30) Foreign Application Priority Data

May 31, 2000 (JP) ........................................ 2000-162455

(51) Int. Cl.[7] .............................................. H02M 3/335
(52) U.S. Cl. .................................. 363/21.12; 363/21.03
(58) Field of Search ........................ 363/16, 20, 21.01, 363/21.02, 21.03, 21.12, 21.14, 95, 97, 131

(56) References Cited

U.S. PATENT DOCUMENTS

| 4,763,235 A | * | 8/1988 | Morita | ........................ | 363/19 |
| 5,661,642 A | * | 8/1997 | Shimashita | .................. | 363/21 |
| 5,719,755 A |   | 2/1998 | Usui | ........................... | 363/19 |
| 6,061,253 A | * | 5/2000 | Igarashi et al. | ............... | 363/19 |
| 6,111,762 A | * | 8/2000 | Igarashi et al. | ............... | 363/21 |

* cited by examiner

Primary Examiner—Matthew Nguyen
(74) Attorney, Agent, or Firm—Woodcock Washburn LLP (57) ABSTRACT

A transformer has a primary winding connected across a d.c. power supply via a parallel connection of a switch and a resonant capacitor, and a secondary winding connected across a load via a rectifying and smoothing circuit. In order for the switch to be turned on and off at zero voltage, there is provided, in parallel with the serial circuit of the transformer primary and the switch, a serial circuit of a tertiary and a quaternary winding of the transformer, a resonant inductor, a first diode, and a second switch. A second diode is connected in parallel with the serial connection of the transformer quaternary, resonant inductor, first diode, and second switch. A switch control circuit is connected between the rectifying and smoothing circuit and the first and second switches for on-off control of the latter according to the converter output voltage. The second switch is so controlled in relation to the first switch that the resonant capacitor is compulsorily caused to discharge, making the voltage across the first switch zero when it is turned on.

7 Claims, 5 Drawing Sheets

(A) INPUTS TO COMPARATORS 15 & 17

(B) OUTPUT FROM COMPARATOR 15

(C) OUTPUT FROM COMPARATOR 17

(D) OUTPUT FROM MMV 18

FIG.6

(A) INPUTS TO COMPARATORS 15 & 17

(B) OUTPUT FROM COMPARATOR 15

(C) OUTPUT FROM COMPARATOR 17

DC-TO-DC CONVERTER

BACKGROUND OF THE INVENTION

This invention relates to d.c.-to-d.c. converters in general and, in particular, to a d.c.-to-d.c. converter designed for zero-voltage switching of a main switch; that is, the main switch of the converter is turned on and off when the voltage across the same is approximately zero for minimal power loss.

U.S. Pat. No. 5,719,755 to Usui is hereby cited as describing and claiming a flyback d.c.-to-d.c. converter bearing particular pertinence to the instant invention. This prior art converter has a transformer with a primary winding connected across a direct-current power supply via an on-off switch, and a secondary winding connected across a load via a rectifying and smoothing circuit. A capacitor is connected in parallel with the switch for partial resonance.

The fundamental operating principle of the flyback d.c.-to-d.c. converter is such that the transformer stores energy from the power supply when the switch is closed, and releases the stored energy for powering the load when the switch is open. Zero-voltage switching is automatically accomplished when the switch goes off, because there is no voltage across the switch when it is on. The voltage across the capacitor rises from zero during each nonconducting period of the switch.

Difficulties were experienced, however, in zero-voltage turning-on of the switch. Should the resonant capacitor have some charge left thereon when the switch was turned on, that charge would be released through the switch, resulting in power loss. It was suggested and practiced to lessen this power loss by causing the capacitor to complete discharge before the switch was turned on.

In a typical conventional zero-voltage-switching method, after the energy that had been stored on the transformer during each conducting period of the switch was released during the ensuing nonconducting period of the switch, the resonant capacitor was discharged by the resonance of the transformer primary and the capacitor. The switch was turned on when the voltage across the resonant capacitor, and hence across the switch, became practically zero. Zero-voltage turning-on of the switch was thus accomplished, but under limited conditions.

The above conventional solution proved unsatisfactory in cases where the input voltage varied much as, say, from 100 to 230 volts. The conducting period of the switch grew less with an increase in input voltage under these conditions. Less energy was stored on the transformer during such shorter periods of time, and correspondingly less time was required for its discharge. The result was the flow of an oscillatory current through the resonance circuit of the capacitor and transformer primary following the completion of discharge.

For this reason the charge on the capacitor was not necessarily been zero when the switch was turned on; in other words, zero-voltage switching did not take place. The efficiency of the converter deteriorated in the cases noted above, as well as in the event of a great reduction in the power requirement of the load.

SUMMARY OF THE INVENTION

The present invention aims, in a d.c.-to-d.c. converter of the kind defined, at zero-voltage switching of the main switch when the switch is not only tuned on but off as well, totally independently of how long the switch is held turned on.

Briefly, the present invention may be summarized as a zerovoltage-switching d.c.-to-d.c. converter to be connected between a d.c. power supply and a load, comprising a transformer having a primary, a secondary, a tertiary, and a quaternary winding. The transformer primary is connected via a first switch to a pair of input terminals which are to be coupled to a d.c. power supply, the first switch being connected in parallel with a resonant capacitor or like capacitance means. The transformer secondary is connected via a rectifying and smoothing circuit to a pair of output terminals which are to be connected to a load to be powered. The transformer tertiary and quaternary are connected in series with each other and with resonant inductance means and a first diode and a second switch, and in parallel with the serial connection of the transformer primary and the first switch. A second diode is connected in parallel with the serial connection of the transformer quaternary and the resonant inductance means and the first diode and the second switch. Also included is a switch control circuit connected to the first and the second switch for making on-off control of these switches. The switch control circuit includes means for turning on the second switch at a first moment that is earlier than the starting moment of each conducting period of the first switch and turning off the second switch at a second moment that is equal to or earlier than the ending moment of each conducting period of the first switch.

The second switch, newly introduced by the instant invention, serves the purpose of compulsorily discharging the resonant capacitor and hence making zero the voltage across the first switch. Thus is accomplished the zero-voltage switching of the first switch when the same is turned on, in addition to when it is turned off.

The first and second switches are controlled by the common switch control circuit in prescribed time relationship to each other. Despite changes in the conducting periods of the first switch, the resonant capacitor is forcibly discharged by the second switch to enable zero-voltage turning-on of the first switch. The switch control circuit requires addition of a minimal number of parts to the preexisting ones for controlling the first switch.

The second switch is itself well calculated not to adversely affect the efficiency of the converter. The second switch is turned on at zero current, and off at zero voltage.

The above and other objects, features and advantages of this invention will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
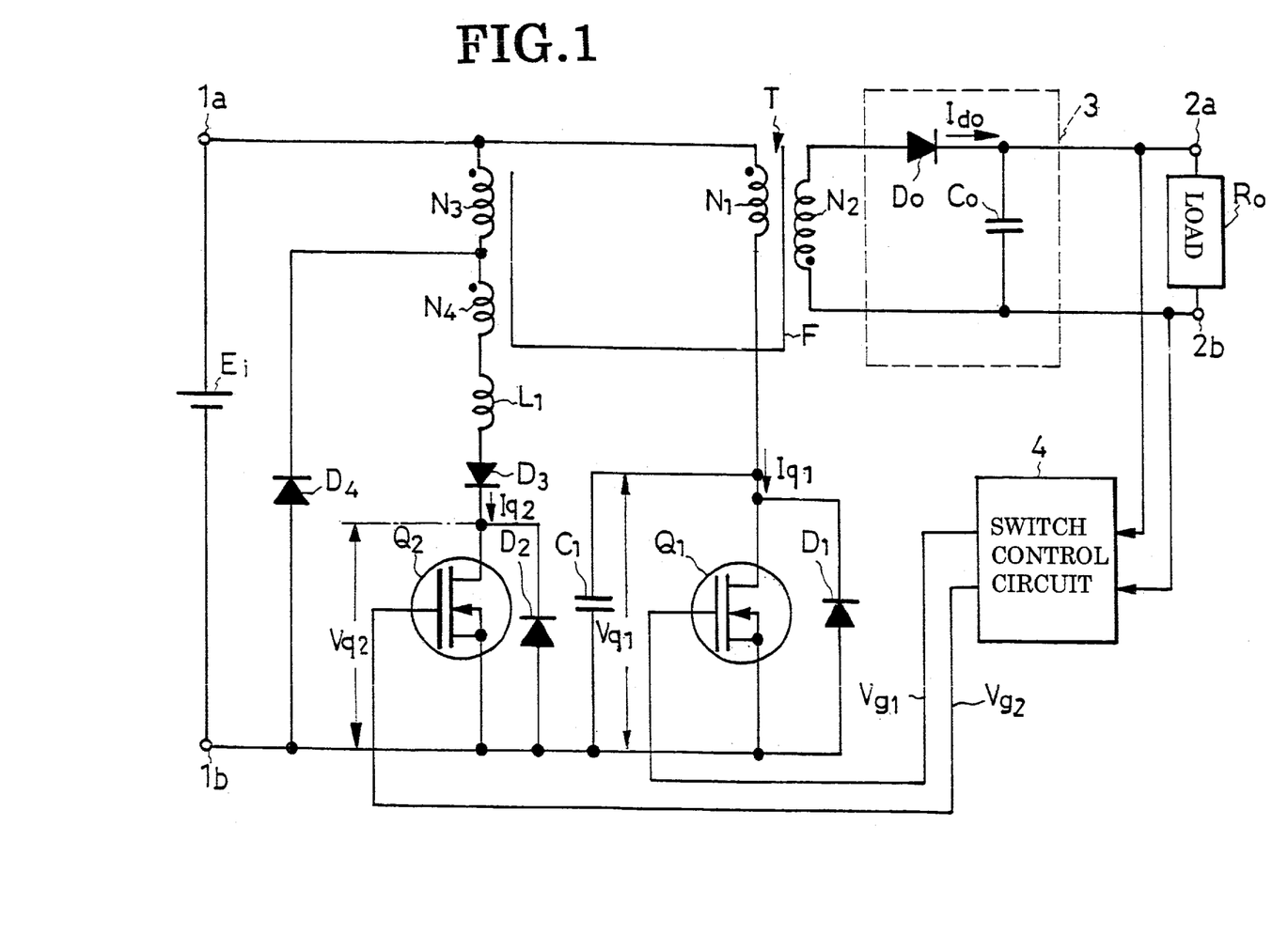
FIG. 1 is a schematic electrical diagram of the zero-voltage-switching flyback d.c.-to-d.c. converter embodying the novel concepts of this invention.

The invention is believed to be best embodied in the flyback d.c.-to-d.c. converter of FIG. 1. The converter has a pair of input terminals 1a and 1b, with a direct-current power supply Ei shown connected therebetween, and a pair of output terminals 2a and 2b with a load Ro shown connected therebetween. The power supply Ei could be serve by a rectifying and smoothing circuit. Between the input and the output terminal pairs there is connected a transformer T having a primary winding $N_1$, a secondary winding $N_2$, a tertiary winding $N_3$, and a quaternary winding $N_4$, all electromagnetically coupled together.

Other primary components of the converter include two switches $Q_1$ and $Q_2$ both in the form of field-effect transistors, a resonant capacitor $C_1$, two diodes $D_1$, and $D_2$ connected in parallel with the respective switches $Q_1$ and $Q_2$, two additional diodes $D_3$ and $D_4$, a rectifying and smoothing circuit 3 connected between the transformer secondary $N_2$ and the pair of output terminals 2a and 2b, a switch control circuit 4 for on-off control of the switches $Q_1$ and $Q_2$ according to the voltage applied to the load Ro, and a resonant inductor $L_1$.

The four windings $N_1$–$N_4$ of the transformer T, all wound around a magnetic core F, have polarities indicated by the dots in FIG. 1. It will therefore be seen that the primary $N_1$ and the secondary $N_2$ winding are oppositely polarized, and the tertiary $N_3$ and quaternary $N_4$ winding are of the same polarization as the primary winding $N_1$ with respect to the voltage of the power supply Ei.

It is also understood that the primary $N_1$ and the tertiary $N_3$ winding are equal in turns, and the quaternary winding $N_4$ less in turns than the primary and tertiary windings. The turns of these transformer windings relate to the voltage applied to the secondary switch $Q_2$. The following relationship exists between the voltages across the switches $Q_1$ and $Q_2$ and the turns of the transformer windings $N_3$ and $N_4$:

$$Vq_2 = Vq_1 + (N_4/N_3)Ei$$

where $Vq_1$=voltage across the first switch $Q_1$
$Vq_2$=voltage across the second switch $Q_2$
$N_3$=turns of the transformer tertiary $N_3$
$N_4$=turns of the transformer quaternary $N_4$.

Consequently, should the transformer quaternary $N_4$ be equal in turns to the transformer primary $N_1$ or tertiary $N_3$, the voltage applied to the second switch $Q_2$ would be twice as high as that applied to the first switch $Q_1$. The turns of the transformer windings should be so determined in relation to one another that the resulting voltages can be well withstood by the switches. No serious problem will occur in countries where the commercial supply voltage is 100 volts. In 200-volt countries, however, the turns of the transformer quaternary $Q_4$ should preferably be from twenty to fifty percent of those of the transformer tertiary $Q_3$.

The transformer primary $N_1$ has one extremity thereof connected to the direct-current supply terminal 1a, and the other extremity grounded via the first switch $Q_1$ and the other direct-current supply terminal 1b. The resonant capacitor $C_1$, or snubber capacitor, is shown connected in parallel with the first switch $Q_1$, and so is the first diode $D_1$. Intended for the flow of a reverse current, the first diode $D_1$ is so oriented as to be reverse-biased by the voltage of the power supply Ei. The provision of the capacitor $C_1$ and the diode $D_1$ is not an absolute requirement.

The rectifying and smoothing circuit 3 comprises a rectifying diode Do and a smoothing capacitor Co. The rectifying diode Do is connected to one extremity of the transformer secondary $N_2$, and the smoothing capacitor Co is connected in parallel with the transformer secondary via the rectifying diode. Since the transformer secondary $N_2$ is opposite in polarity to the transformer primary $N_1$, the rectifying diode Do will be nonconductive while the supply voltage is being impressed to the transformer primary $N_1$. The rectifying diode Do will conduct in response to the voltage developing across the transformer secondary $N_2$ due to the release of the energy from the transformer T when the first switch $Q_1$ goes off. Thereupon the smoothing capacitor Co will be charged, and power supplied to the load Ro.

The transformer tertiary $N_3$ and quaternary $N_4$, the resonant inductor $L_1$, the third diode $D_3$, and the second switch $Q_2$ are all connected in series with one another to form an auxiliary resonant circuit. This auxiliary resonant circuit is in parallel relationship both to the power supply Ei and to the serial circuit of the transformer primary $N_1$ and first switch $Q_1$. The third diode $D_3$ is so oriented as to be forward-biased by the supply voltage. The second diode $D_2$ is connected in parallel with the second switch $Q_2$. This second diode could be omitted, however, if its purposes could be served by the inherent or parasitic diode of the switch $Q_2$. Polarized to be reverse-biased by the supply voltage, the fourth diode $D_4$ is connected in parallel with the auxiliary resonant circuit of the transformer tertiary $N_3$ and quaternary $N_4$, the resonant inductor $L_1$, the third diode $D_3$, and the second switch $Q_2$.

The switch control circuit 4, to be detailed hereinbelow with reference to FIG. 2, has inputs connected to the pair of converter output terminals 2a and 2b, and outputs connected to the gates of the FET switches $Q_1$ and $Q_2$. The first switch control signal $Vg_1$ applied from the switch control circuit 4 to the first switch $Q_1$ is shown at (A) in FIG. 3, and the second switch control signal $Vg_2$ applied therefrom to the second switch $Q_2$ at (B) in FIG. 3.

Figure 2:
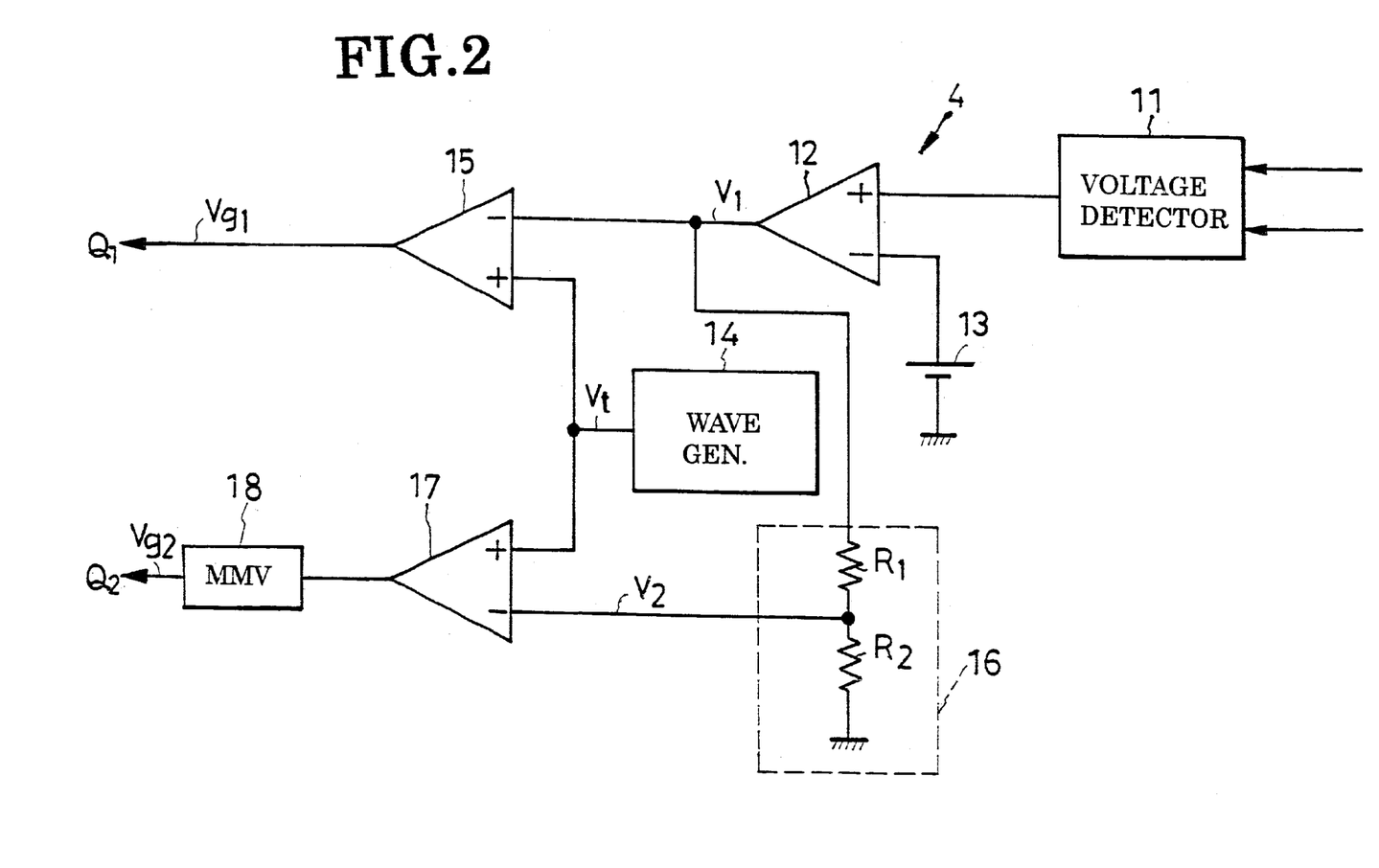
FIG. 2 is a schematic electrical diagram, partly in block form, of the switch control circuit of the FIG. 1 d.c.-to-d.c. converter.

With reference to FIG. 2 the switch control circuit 4 has a voltage detector circuit 11 connected to the pair of converter output terminals 2a and 2b for putting out a signal indicative of the converter output voltage. This detector output signal is applied to one input of a differential amplifier 12, the other input of which is connected to a source 13 of a reference voltage representative of a target value at which the converter output voltage should be maintained. The output $V_1$ from the differential amplifier 12, indicative of a possible departure of the converter output voltage from the target value, is applied to one input of a comparator 15, the other input of which is connected to a wave generator 14. The wave generator 14 generates a triangular wave or a sawtooth as a periodic wave having a high frequency (e.g. 20–150 kHz).

Figure 3:
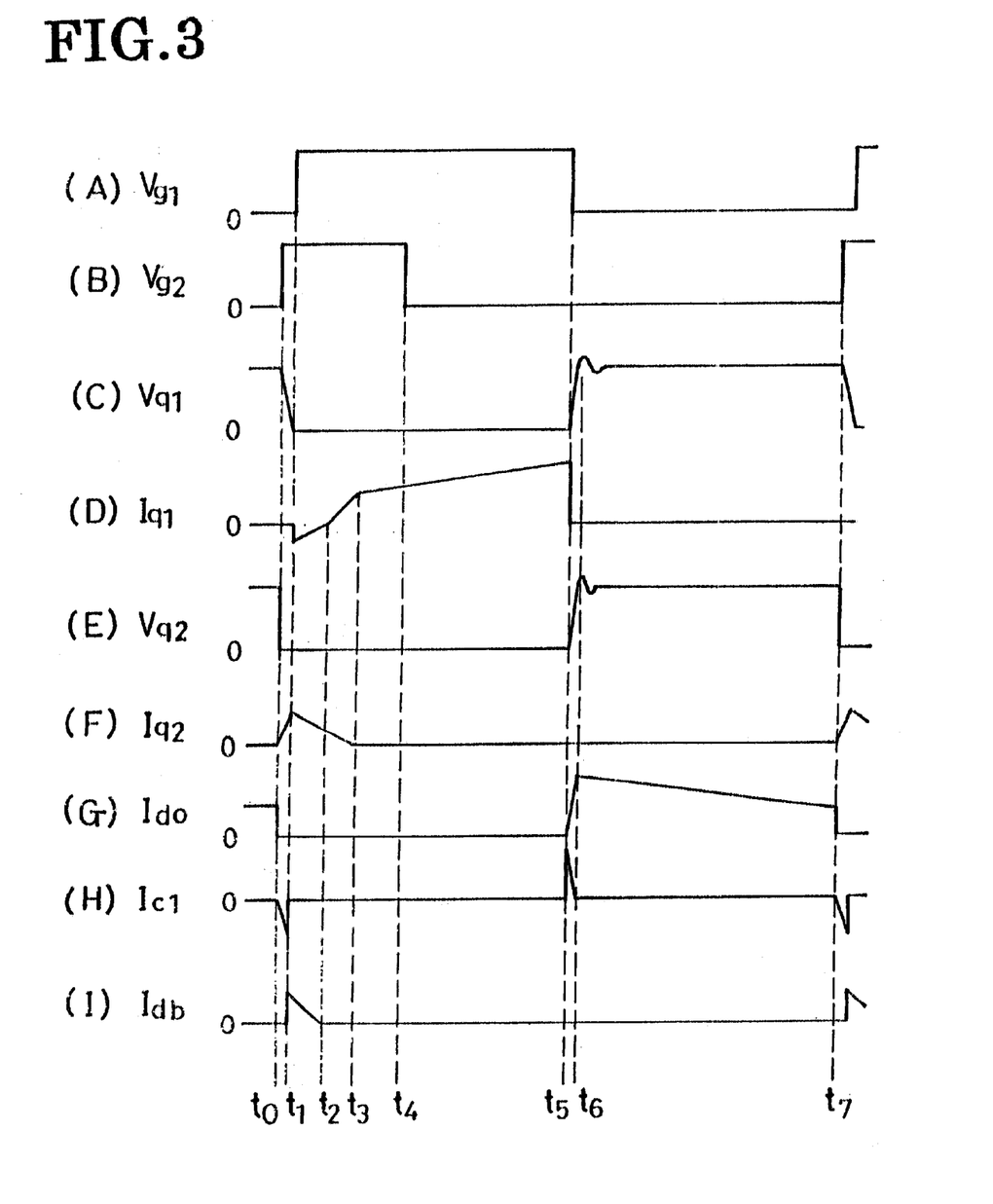
FIG. 3, consisting of (A) through (I), is a set of voltage and current waveform diagrams useful in explaining the operation of the FIG. 1 d.c.-to-d.c. converter.
Figure 4:
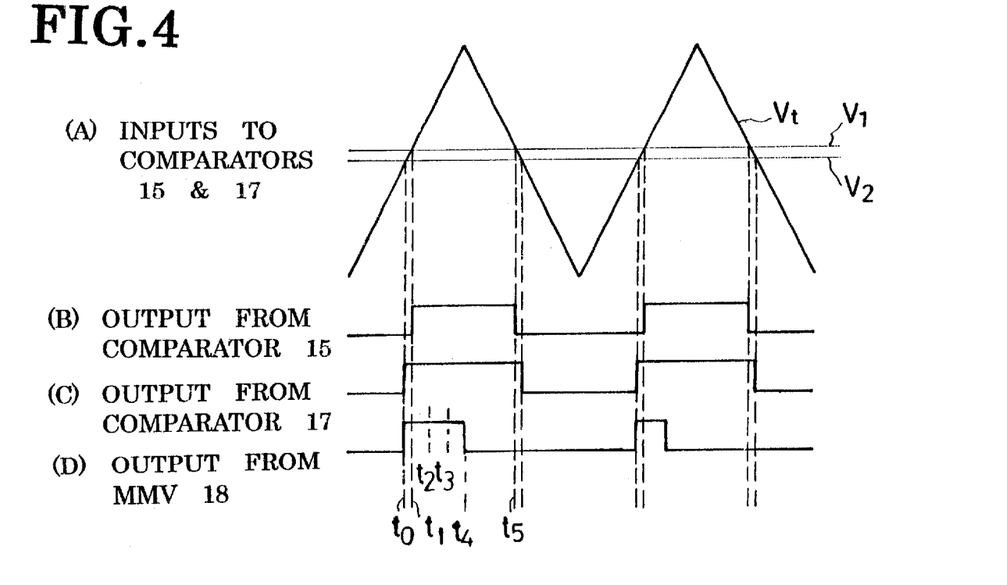
FIG. 4, consisting of (A) through (D), is a set of voltage waveform diagrams useful in explaining the operation of the FIG. 2 switch control circuit.

FIG. 4 shows at (A) both the departure signal $V_1$ and the triangular wave voltage Vt of, say, 20–150 kHz delivered from the wave generator 14 to the comparator 15. The resulting output from the comparator 15 is a series of duration-modulated pulses indicated at (B) in FIG. 4, which are impressed as the noted first switch control signal $Vg_1$, (A) in FIG. 3, to the first switch $Q_1$.

Also connected to the output of the differential amplifier 12 is a voltage divider circuit 16 having two resistors $R_1$ and $R_2$ connected in series between differential amplifier output and ground. The output $V_2$ from the voltage divider circuit 16, with a voltage less than that of the departure signal $V_1$, is delivered to one input of a second comparator 17, the other input of which receives the triangular wave voltage Vt from the wave generator 14. The resulting output from the second comparator 17 is another series of duration-modulated pulses seen at (C) in FIG. 4, which are delivered to a monostable multivibrator (MMV) 18. A comparison of (B) and (C) in FIG. 4 will reveal that the output pulses of the second comparator 17 are of greater duration than those of the first comparator 15.

Triggered by the leading edges of the output pulses from the second comparator 17, the MMV 18 will put out the pulses shown at (D) in FIG. 4. These MMV output pulses constitute the second switch control signal $Vg_2$, (B) in FIG. 3, each lasting as from a first moment $t_0$ to a second moment $t_4$. The moment $t_4$ of decay of each pulse of the second switch control signal $Vg_2$ may be delayed until $t_5$ at a maximum. The second switch control signal $Vg_2$ is delivered to the second switch $Q_2$.

Operation

The operation of the FIGS. 1 and 2 flyback d.c.-to-d.c. converter will be best understood by separately studying what happens in the before-$t_0$ period, $t_0$–$t_1$ period, $t$–$t_2$ period, $t_2$–$t_3$ period, $t_3$–$t_4$ period, $t_4$–$t_5$ period, $t_5$–$t_6$ and $t_6$–$t_7$ period of FIG. 3. The following operational description will therefore be divided under the subheadings denoting these periods.

The pre-$t_0$ Period

The switches $Q_1$ and $Q_2$ are both open during these periods. As the energy that has been stored on the transformer T during the previous conducting period of the first switch $Q_1$ is released, there will build up across the transformer secondary $N_2$ a voltage that will forward-bias the rectifying diode Do. With the consequent conduction of the rectifying diode Do as at (G) in FIG. 3, the smoothing capacitor Co will be charged, and the load Ro powered.

The $t_0$–$t_1$ Period

It is understood that the second switch $Q_2$ is turned on at to, and the first switch $Q_1$ at $t_1$, as at (A) and (B) in FIG. 3. The resonant capacitor $C_1$ will be discharged by resonance during this period, resulting in a gradual drop of the voltage $Vq_1$, (C) in FIG. 3, across the first switch $Q_1$, to zero. Since the second switch $Q_2$ is conductive throughout the $t_0$–$t_1$ period, a current will flow both along a first path comprising the power supply Ei, transformer tertiary $N_3$, transformer quaternary $N_4$, resonant inductor $L_1$, third diode $D_3$, and second switch $Q_2$, and a second path comprising the resonant capacitor $C_1$, transformer primary $N_1$, transformer tertiary $N_3$, transformer quaternary $N_4$, resonant inductor $L_1$, third diode $D_3$, and second switch $Q_2$.

With the current flow through the transformer tertiary $N_3$ and quaternary $N_4$ along the second path, there will develop across the transformer secondary $N_2$ a voltage that will reverse-bias the rectifying diode Do and so render the same nonconductive. The diode current Ido will thus become zero as at (G) in FIG. 3. The resonant capacitor $C_1$ will then be discharged, causing a drop in the voltage $Vq_1$ across the first switch $Q_1$ until it becomes zero at $t_1$, as at (C) in FIG. 3.

As indicated at (F) in FIG. 3, the current $Iq_2$ through the second switch $Q_2$ will gradually rise in magnitude from $t_0$, thanks to the inductor $L_1$ connected in series therewith. Thus has been accomplished the zero-current switching of the second switch $Q_2$.

The $t_1$–$t_2$ Period

The voltage $Vq_1$ across the first switch $Q_1$ is practically zero when the first switch is turned on at $t_1$. This zero-voltage switching of the first switch $Q_1$ leads to the reduction of switching loss. During the ensuing $t_1$–$t_2$ period, owing to the liberation of the energy that has been stored on the resonant inductor $L_1$ during the $t_0$–$t_1$ period, a current will flow through the path comprising the resonant inductor $L_1$, third diode $D_3$, second switch $Q_2$, first diode $D_1$, or first switch $Q_1$, transformer primary $N_1$, transformer tertiary $N_3$, and transformer quaternary $N_4$. A current will also flow through the path comprising the resonant inductor $L_1$, third diode $D_3$, second switch $Q_2$, power supply Ei, transformer tertiary $N_3$, and transformer quaternary $N_4$, as well as through the path comprising the resonant inductor $L_1$, third diode $D_3$, second switch $Q_2$, fourth diode $D_4$, and transformer quaternary $N_4$.

The current $Iq_1$ shown at (D) in FIG. 3 represents the sum of the current through the first switch $Q_1$ and the current through the first diode $D_1$. The current $Iq_1$ is therefore negative when the current is flowing through the first diode $D_1$.

With the current flow through the transformer tertiary $N_3$ and quaternary $N_4$ during the $t_1$–$t_2$ period, there will develop across the transformer secondary $N_2$ a voltage that will reverse-bias the rectifying diode Do. No power will then be fed to the load Ro, and energy will be stored instead on the transformer T, that energy being released from the inductor $L_1$.

The $t_2$–$t_3$ Period

At $t_2$, when both first diode $D_1$, and fourth diode $D_4$ cease to be forward-biased, the current will no longer flow through the path comprising the resonant inductor $L_1$, third diode $D_3$, second switch $Q_2$, first diode $D_1$, transformer primary $N_1$, transformer tertiary $N_3$, and transformer quaternary $N_4$, and so will the current Idb through the path comprising the resonant inductor $L_1$, third diode $D_3$, second switch $Q_2$, fourth diode $D_4$, and transformer quaternary $N_4$. The residual energy of the resonant inductor $L_1$ will therefore be released through the path comprising the resonant inductor $L_1$, third diode $D_3$, second switch $Q_2$, power supply Ei, transformer tertiary $N_3$, and transformer quaternary $N_4$ during this $t_2$–$t_3$ period.

Since the first switch $Q_1$ has been on since $t_1$, the forward current $Iq_1$ of the first switch will flow through the path comprising the power supply Ei, transformer primary $N_1$, and first switch $Q_1$. The rectifying diode Do is now nonconductive, so that energy will be stored on the inductive transformer T.

The $t_3$–$t_4$ Period

At $t_3$ the current $Iq_2$, shown at (F) in FIG. 3, through the second switch $Q_2$ becomes zero, and at $t_4$ the second switch is turned off. Although the second switch $Q_2$ is on during this period, the third diode $D_3$ is held reverse biased, so that the current $Iq_2$ will now flow through the second switch. Only the current $Iq_1$ will flow through the path comprising the power supply Ei, transformer primary $N_1$, and first switch $Q_1$, causing the storage of energy on the transformer T.

The conducting period of the second switch $Q_2$ should expire at or after $t_3$ and at latest $t_5$. Further the starting moment to of the $t_0$–$t_4$ conducting period of the second switch $Q_2$ should be so determined that the voltage $Vq_1$ across the first switch $Q_1$ may be made approximately zero by resonance at the subsequent starting moment $t_1$, of the conducting period of the first switch. In short the $t_0$–$t_1$ period should be sufficiently long for the resonant capacitor $C_1$ to be substantially fully discharged. The length of time required for the voltage $Vq_1$ across the first switch $Q_1$ to change from its value at $t_0$ to that at $t_1$, depends upon the circuit constant of the resonant circuit. The voltage divider circuit 16, FIG. 2, of the switch control circuit 4 is designed to determine one of the input levels of the second comparator 17 in order that the $t_0$–$t_1$ period of FIG. 3 may be obtained.

The first switch $Q_1$ may be turned on at any moment from $t_1$, when the voltage $Vq_1$ across the first switch becomes zero as at (C) in FIG. 3, to $t_2$ when the first diode $D_1$ becomes nonconductive. The voltage across the first switch $Q_1$ is zero during the $t_1$–$t_2$ period when the voltage across the resonant capacitor $C_1$ is zero and when the first diode $D_1$ is conductive. The first switch $Q_1$ can therefore be zero-voltage switched by the first switch control signal $Vg_1$, (A) in FIG. 3, during the $t_1$–$t_2$ period.

At (A) in FIG. 3 is shown the first switch control signal $Vg_1$ to go high at $t_1$. In practice the first switch control signal $Vg_1$ may go high preferably at a moment approximately midway between $t_1$ and $t_2$. However, even if the first switch $Q_1$ is turned on earlier than $t_1$, when the voltage $Vq_1$ across the same becomes zero, and not earlier than $t_0$, when the voltage $Vq_1$ starts dwindling, the switching loss will be reduced by an amount proportional to the drop of the first switch voltage $Vq_1$.

It must also be pointed out that the reduction of switching loss is possible even if the first switch $Q_1$ is turned on shortly after $t_2$. The resonant capacitor $C_1$ will start to be charged at $t_2$ if then the first switch $Q_1$ is left turned off. But even then, if the voltage is lower than the voltage $Vq_1$ across the first switch $Q_1$ at $t_0$, switching loss will become correspondingly less.

Speaking broadly, therefore, the first switch $Q_1$ may be turned on at any moment that is later than $t_0$, when the second switch $Q_2$ is turned on, as long as the voltage $Vq_1$ across the first switch $Q_1$ is less than that when the first switch is off.

As indicated at (B) in FIG. 3, the second switch $Q_2$ is turned off at $t_4$ which is later than $t_3$ when the current $Iq_2$ through the second switch becomes zero as at (F) in FIG. 3. Zero-current turnoff of the second switch $Q_2$ is thus accomplished for less power loss due to the second switch.

The $t_4$–$t_5$ Period

During this period, as during the preceding $t_3$–$t_4$ period, the current $Iq_1$ will flow through the path comprising the power supply Ei, transformer primary Ni, and first switch $Q_1$, causing energy to be stored on the transformer T. The current through the transformer primary $N_1$, which is inductive, will increase in magnitude with time, as at (D) in FIG. 3. The rectifying diode Do is nonconductive during this period, so that power will be fed to the load Ro from the smoothing capacitor Co.

The $t_5$–$t_6$ Period

This brief period is a period of transition from the conductive to the nonconductive state of the first switch $Q_1$. The resonant capacitor $C_1$ will start to be charged when the first switch $Q_1$ is actually turned off in response to the going-low of the first switch control signal $Vg_1$, (A) in FIG. 3, at $t_5$. The voltage $Vg_1$ across the resonant capacitor $C_1$ and hence across the first switch $Q_1$ will build up, as at (C) in FIG. 3, in step with the progress of the charging of the capacitor. It is thus seen that the zero-voltage turning-off of the first switch $Q_1$ has been accomplished. The energy that has been stored on the transformer T will start to be released in this period, and the diode current Ido will start flowing as at (G) in FIG. 3.

The $t_6$–$t_7$ Period

The $t_6$–$t_7$ period of FIG. 3 is akin to the pre-$t_0$ period set forth above. One cycle of converter operation, which has started at $t_0$, comes to an end at $t_7$, and the same cycle repeats itself thereafter.

As will be understood by referring back to FIG. 2, the durations of the output pulses $Vg_1$ and $Vg_2$, (A) and (B) in FIG. 3, of the two comparators 15 and 17 of the switch control circuit 4 are subject to change depending upon the magnitude of the converter output voltage. For instance, upon increase in the converter output voltage above the target value, both the output voltage $V_1$ of the differential amplifier 12 and the output voltage $V_2$ of the voltage divider circuit 16 will become proportionately higher.

A study of FIG. 4 will show that, inputting these higher voltages, the comparators 15 and 17 put out pulses of correspondingly shorter durations. The shorter-duration output pulses of the first comparator 15 will lessen the duty ratio of the first switch $Q_1$, with the result that less power will be fed from transformer T to load Ro. It is self-evident, then, how more power is fed to the load Ro in the event of a drop in the converter output voltage below the target value.

The advantages gained by this particular embodiment of the invention may be recapitulated as follows:

1. The zero-voltage switching of the first switch $Q_1$, both when it is turned on and off, and the zero-voltage turning-off and zero-current turning-on of the second switch $Q_2$, are accomplished. The results of all this are less power loss and less heat radiation.

2. The zero-voltage switching of the first switch $Q_1$ is unhampered even when its conducting periods are very short. This is because the second switch $Q_2$ is turned on shortly before the first switch $Q_1$ is, thereby causing the resonant capacitor $C_1$ to discharge. The first switch $Q_1$ is subsequently turned on at zero voltage, irrespective of the magnitude of the charge on the resonant capacitor and of variation in the moment of completion of energy release from the transformer T.

3. For the same reason as set forth in connection with the second advantage above, the zero-voltage turning-on of the first switch $Q_1$ is totally unaffected by variations in the durations of the switch control pulses $Vg_1$, due to fluctuations in the supply voltage or in the power requirement of the load.

4. The second switch $Q_2$ is controlled merely by adding, as illustrated in FIG. 2, the voltage divider circuit 16, second comparator 17 and MMV 18 to the duration-modulated pulse generator of familiar make comprising the wave generator 14 and first comparator 15.

Alternate Embodiment

Figure 5:
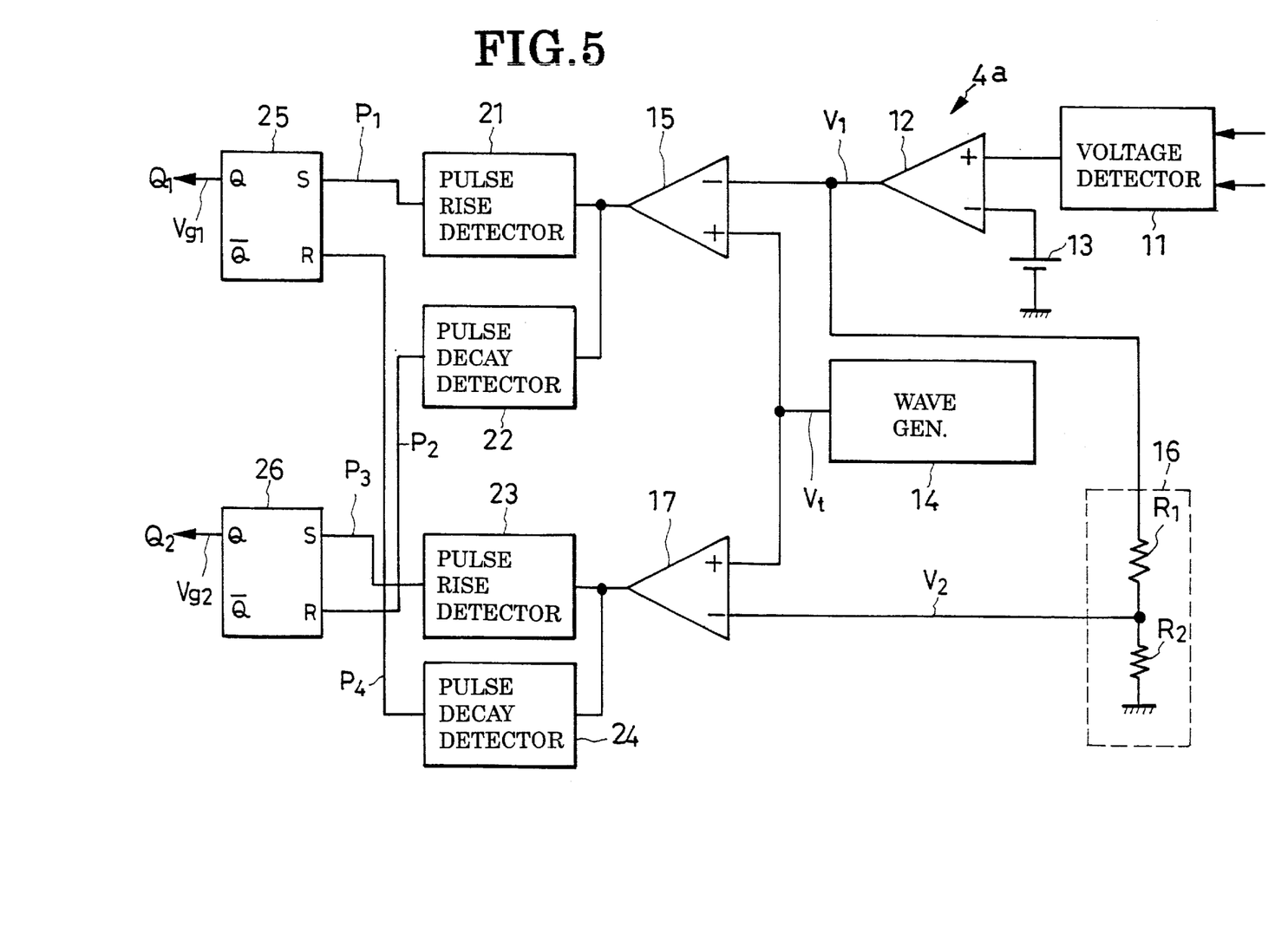
FIG. 5 is a schematic electrical diagram, partly in block form, of another preferred form of switch control circuit of the FIG. 1 d.c.-to-d.c. converter.

FIG. 5 shows a modified switch control circuit 4a for use in the FIG. 1 d.c.-to-d.c. converter in substitution for the FIG. 2 switch control circuit 4. A comparison of FIGS. 2 and 5 will reveal that the switch control circuits 4 and 4a are alike in having the comparators 15 and 17 and all the means connected to their inputs. The inputs to, and outputs from, the comparators 15 and 17 of the modified switch control circuit 4a are as depicted at (A)–(C) in FIG. 6, which are equivalent to (A)–(C) in FIG. 4.

The output stages of the FIG. 5 comparators 15 and 17 differ from those of their FIG. 2 counterparts. The output of the first comparator 15 is connected to both pulse rise detector circuit 21 and pulse decay detector circuit 22, and the output of the second comparator 17 to both pulse rise detector circuit 23 and pulse decay detector circuit 24. The pulse rise detector circuits 21 and 23 are connected to the set inputs S of RS flip-flops 25 and 26, respectively. The first pulse decay detector circuit 22 is connected to the reset input R of the second flip-flop 26, and the second pulse decay detector circuit 24 to the reset input R of the first flip-flop 25. The noninverting outputs Q of the flip-flops 25 and 26 are connected to the gates of the FET switches $Q_1$ and $Q_2$, respectively, of the FIG. 1 d.c.-to-d.c. converter.

Figure 6:
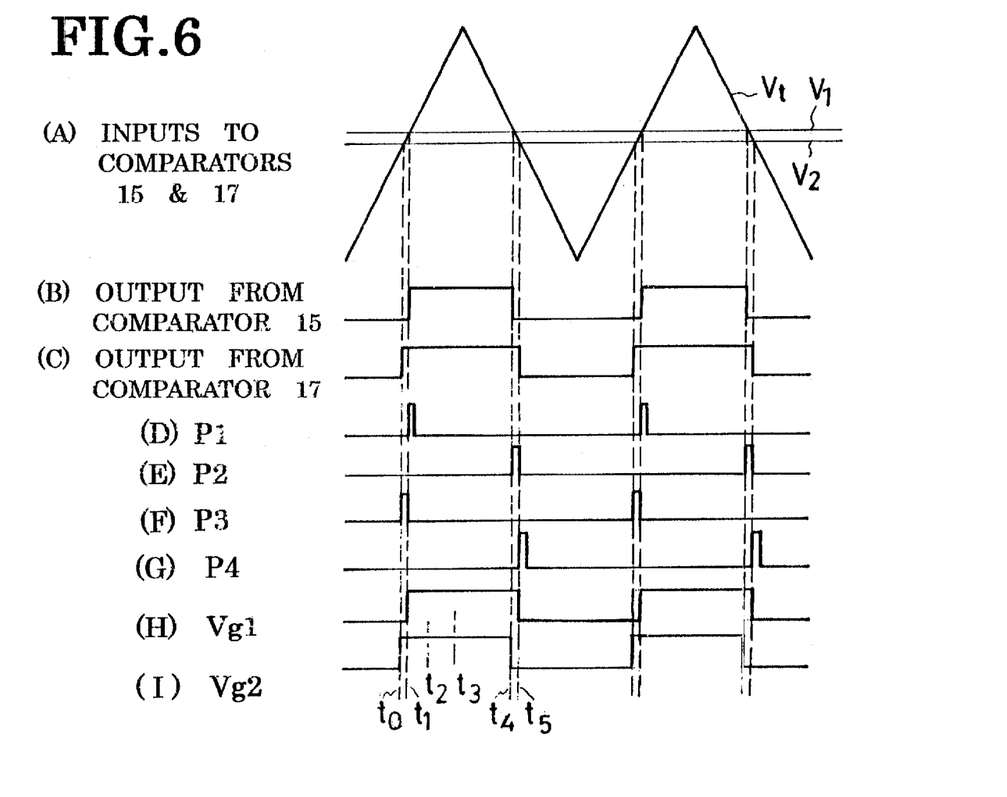
FIG. 6, consisting of (A) through (I), is a set of voltage waveform diagrams useful in explaining the operation of the FIG. 5 switch control circuit.

The first pulse rise detector circuit 21 puts out a series of trigger pulses $P_1$, (C) in FIG. 6, in response to the leading edges of the FIG. 6(B) output pulses of the first comparator 15. The first pulse decay detector circuit 23 puts out a series of trigger pulses $P_2$, FIG. 6(E), in response to the trailing edges of the FIG. 6(B) output pulses of the first comparator 15. The second pulse rise detector circuit 23 puts out a series of trigger pulses $P_3$, FIG. 6(F), in response to the leading edges of the FIG. 6(C) output pulses of the second comparator 17. The second pulse decay detector circuit 24 responds to the trailing edges of the FIG. 6(C) output pulses of the second comparator 17 by producing a series of trigger pulses $P_4$, FIG. 6(G).

The first flip-flop 25 will therefore be set, as at $t_1$ in FIG. 6, by each output pulse $P_1$ of the first pulse rise detector circuit 21, and reset, as at $t_5$, by each output pulse $P_4$ of the second pulse decay detector circuit 24. So set and reset, the first flip-flop 25 will provide the first switch control signal $V_{g_1}$, FIG. 6(H), consisting of a series of pulses each lasting as from $t_1$ to $t_5$ in FIG. 6, for delivery to the first switch $Q_1$, FIG. 1.

The second flip-flop 26 will be set, as at $t_0$ in FIG. 6, by each output pulse $P_3$ of the second pulse ride detector circuit 23, and reset, as at $t_4$, by each output pulse $P_2$ of the first pulse decay detector circuit 22. The second flip-flop 26 will thus provide the second switch control signal $V_{g_2}$, FIG. 6(I), consisting of a series of pulses each lasting as from $t_0$ to $t_4$ in FIG. 6.

As will be understood from a comparison of (H) and (I) in FIG. 6 and (C) and (D) in FIG. 4, the two switch control signals $V_{g_1}$ and $V_{g_2}$ produced by the FIG. 5 switch control circuit 4a are equivalent to those produced by the FIG. 2 switch control circuit 4. The switches $Q_1$ and $Q_2$ of the FIG. 1 d.c.-to-d.c. converter are therefore controllable by either circuit 4 or 4a.

An advantage peculiar to the FIG. 5 switch control circuit 4a is that the durations of both first and second series of switch control pulses $V_{g_1}$ and $V_{g_2}$ are correlated. The durations of the first series of switch control pulses $V_{g_1}$ may therefore be determined at will without regard to the durations of the second series of switch control pulses $V_{g_2}$.

Possible Modifications

Notwithstanding the foregoing detailed disclosure it is not desired that the present invention be limited by the exact showing of the drawings or by the description thereof. The following, then, is a brief list of possible modifications or alterations of the illustrated embodiments which are all believed to fall within the purview of the instant invention:

1. Semiconductor switches other than FETs, such as bipolar transistors and IGBTs, may be employed as the switches $Q_1$ and $Q_2$.

2. The inductor $L_1$ is per se not a necessity; instead, the transformer tertiary $N_3$ and quaternary $N_4$ could be loosely coupled to the transformer primary $N_1$, for more leakage inductances. The increased inductance of the transformer tertiary and/or quaternary will then serve the purpose of the inductor $L_1$.

3. The purposes of the resonant capacitor $C_1$ could be served by parasitic capacitance between the drain and source of the first FET switch $C_1$.

4. The purposes of the first diode $D_1$ could also be served by the inherent or parasitic diode of the first switch $Q_1$.

5. Unlike the showing of FIG. 1 the transformer primary $N_1$, tertiary $N_3$ and quaternary $N_4$ need not be equal in turns; instead, for instance, the primary and the tertiary could be equal, and the quaternary different therefrom.

6. The voltage detector circuit 11, FIGS. 2 and 5, of the switch control circuit 4 or 4a could be connected directly to the first comparator 15 and to the voltage divider circuit 16, instead of via the differential amplifier 12.

7. The invention could be applied to a forward d.c.-to-d.c. converter such that the rectifying diode Do conducts when the first switch $Q_1$ is closed.

What is claimed is:

1. A d.c.-to-d.c. converter to be connected between a d.c. power supply and a load, comprising:

(a) a pair of input terminals to be connected to a d.c. power supply;

(b) a transformer having a primary winding, a secondary winding, a tertiary winding, and a quaternary winding which are all electromagnetically coupled together, the primary winding having one extremity thereof connected to one of the pair of input terminals;

(c) a pair of output terminals to be connected to a load;

(d) a rectifying and smoothing circuit connected between the secondary winding of the transformer and the pair of output terminals;

(e) a first switch connected between the other extremity of the primary winding of the transformer and the other of the pair of input terminals;

(f) resonant capacitance means connected in parallel with the first switch;

(g) resonant inductance means;

(h) a first diode;

(i) a second switch, the tertiary winding and quaternary winding of the transformer and the resonant inductance means and the first diode and the second switch being all connected in series with one another and in parallel with the serial connection of the primary winding of the transformer and the first switch, the first diode being so oriented as to be forward-biased by a supply voltage to be applied from the pair of input terminals;

(j) a second diode connected in parallel with the serial connection of the quaternary winding of the transformer and the resonant inductance means and the first diode and the second switch, the second diode being so oriented as to be reverse-biased by the supply voltage to be applied from the pair of input terminals; and (k) a switch control circuit connected to the first and the second switch for making on-off control of the first and the second switch, the switch control circuit including means for turning on the second switch at a first moment that is earlier than a starting moment of each conducting period of the first switch and turning off the second switch at a second moment that is equal to or earlier than an ending moment of each conducting period of the first switch.

2. The d.c.-to-d.c. converter of claim 1 wherein the switch control circuit comprises:

(a) voltage detector means connected to the rectifying and smoothing circuit for putting out a voltage in proportion to the converter output voltage being applied to the load;

(b) a voltage divider circuit connected to the voltage detector means for putting out a voltage indicative of a predetermined fraction of the output voltage of the voltage detector means;

(c) a wave generator for generating a periodic wave;

(d) a first comparator having inputs connected to the voltage detector means and the wave generator for putting out a first switch control signal in the form of a series of pulses indicative of whether the output voltage of the voltage detector means is greater or less than the periodic wave, the first comparator having an output connected to the first switch for on-off control thereof by the first switch control signal;

(e) a second comparator having inputs connected to the voltage divider circuit and the wave generator for providing a series of output pulses indicative of whether the output voltage of the voltage divider circuit is greater or less than the periodic wave; and (f) a pulse generator connected to the second comparator for putting out a second switch control signal in the form of a series of pulses each rising with one output pulse of the second comparator and each decaying equal to or earlier than one output pulse of the first comparator, the pulse generator having an output connected to the second switch for on-off control thereof by the second switch control signal.

3. The d.c.-to-d.c. converter of claim 2 wherein the pulse generator of the switch control circuit is a monostable multivibrator.

4. The d.c.-to-d.c. converter of claim 1 wherein the switch control circuit comprises:

(a) voltage detector means connected to the rectifying and smoothing circuit for putting out a voltage in proportion to the converter output voltage being applied to the load;

(b) a voltage divider circuit connected to the voltage detector means for putting out a voltage indicative of a predetermined fraction of the output voltage of the voltage detector means;

(c) a wave generator for generating a periodic wave;

(d) a first comparator having inputs connected to the voltage detector means and the wave generator for putting out a first series of pulses indicative of whether the output voltage of the voltage detector means is greater or less than the periodic wave;

(e) a second comparator having inputs connected to the voltage divider circuit and the wave generator for putting out a second series of pulses indicative of whether the output voltage of the voltage divider circuit is greater or less than the periodic wave;

(f) a first pulse rise detector circuit connected to the first comparator for detecting the rise of each output pulse thereof;

(g) a first pulse decay detector circuit connected to the first comparator for detecting the decay of each output pulse thereof;

(h) a second pulse rise detector circuit connected to the second comparator for detecting the rise of each output pulse thereof;

(i) a second pulse decay detector circuit connected to the second comparator for detecting the decay of each output pulse thereof;

(j) a first flip-flop connected to the first pulse rise detector circuit and the second pulse decay detector circuit in order to be set in response to the leading edge of each output pulse of the first comparator and reset in response to the trailing edge of each output pulse of the second comparator, the first flip-flop putting out a first switch control signal for on-off control of the first switch; and (k) a second flip-flop connected to the second pulse rise detector circuit and the first pulse decay detector circuit in order to be set in response to the leading edge of each output pulse of the second comparator and reset in response to the trailing edge of each output pulse of the first comparator, the second flip-flop putting out a second switch control signal for on-off control of the second switch.

5. The d.c.-to-d.c. converter of claim 1 wherein the rectifying and smoothing circuit comprises:

(a) a rectifying diode connected to one extremity of the secondary winding of the transformer and so polarized as to become conductive in response to the a voltage building up in the transformer secondary when the first switch is off; and (b) a smoothing capacitor connected in parallel with the transformer secondary via the rectifying diode.

6. The d.c.-to-d.c. converter of claim 1 wherein the tertiary winding and quaternary winding of the transformer are of the same polarity as the primary winding of the transformer with respect to the supply voltage to be applied from the pair of input terminals.

7. The d.c.-to-d.c. converter of claim 1 further comprising a third diode connected in parallel with the first switch, the third diode being so oriented as to be reverse-biased by the supply voltage to be applied from the pair of input terminals.

* * * * *

UNITED STATES PATENT AND TRADEMARK OFFICE
CERTIFICATE OF CORRECTION

PATENT NO. : 6,396,719 B2
DATED : May 28, 2002
INVENTOR(S) : Morita et al.

It is certified that error appears in the above-identified patent and that said Letters Patent is hereby corrected as shown below:

Column 5,
Line 40, please delete "to" and insert therefor -- $t_0$ --.

Signed and Sealed this

Fourteenth Day of January, 2003

JAMES E. ROGAN
*Director of the United States Patent and Trademark Office*